US012438213B2

(12) United States Patent
Scholemann et al.

(10) Patent No.: US 12,438,213 B2
(45) Date of Patent: Oct. 7, 2025

(54) HOUSING ARRANGEMENT FOR RECEIVING ELECTRICAL STORAGE

(71) Applicant: Muhr und Bender KG, Attendorn (DE)

(72) Inventors: Björn Scholemann, Drolshagen (DE); Turan Nurcan, Langenfeld (DE); Elisabeth Danger, Paderborn (DE); Bünyamin Özcan, Attendorn (DE)

(73) Assignee: Muhr und Bender KG, Attendorn (DE)

( * ) Notice: Subject to any disclaimer, the term of this patent is extended or adjusted under 35 U.S.C. 154(b) by 935 days.

(21) Appl. No.: 17/626,541

(22) PCT Filed: Jul. 15, 2020

(86) PCT No.: PCT/EP2020/070044
§ 371 (c)(1),
(2) Date: Jan. 12, 2022

(87) PCT Pub. No.: WO2021/009256
PCT Pub. Date: Jan. 21, 2021

(65) Prior Publication Data
US 2022/0247012 A1    Aug. 4, 2022

(30) Foreign Application Priority Data
Jul. 15, 2019  (DE) .................. 10 2019 210 400.2

(51) Int. Cl.
*H01M 10/6556*  (2014.01)
*H01M 10/613*   (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS

| 11,223,080 | B2 * | 1/2022 | Kellner | ................. | H01M 50/24 |
| 2015/0171486 | A1 * | 6/2015 | Rawlinson | .......... | H01M 50/249 |
| | | | | | 324/426 |

(Continued)

FOREIGN PATENT DOCUMENTS

| CN | 107123761 A | 9/2017 |
| CN | 207250598 U | 4/2018 |

(Continued)

OTHER PUBLICATIONS

English machine translation of CN-109361037-A (Year: 2019).*
(Continued)

*Primary Examiner* — Scott J. Chmielecki
(74) *Attorney, Agent, or Firm* — Brooks Kushman P.C.

(57) ABSTRACT

The disclosure relates to a housing assembly for receiving electrical storage means for an electrically drivable motor vehicle, comprising: a frame comprising a plurality of frame elements made of a metallic material, with at least one of said frame elements having a variable sheet thickness over a longest length; a base connected to the frame so as to form a sealed shell; and a cover releasably connectable to the frame, wherein the base, the frame and the cover enclose a receiving space for electrical storage means, wherein the base comprises an integral cooling structure through which a coolant can flow.

15 Claims, 8 Drawing Sheets

(51) Int. Cl.
*H01M 10/625* (2014.01)
*H01M 10/647* (2014.01)
*H01M 50/22* (2021.01)
*H01M 50/236* (2021.01)
*H01M 50/244* (2021.01)
*H01M 50/249* (2021.01)

(52) U.S. Cl.
CPC ......... *H01M 10/647* (2015.04); *H01M 50/22* (2021.01); *H01M 50/236* (2021.01); *H01M 50/244* (2021.01); *H01M 50/249* (2021.01); *H01M 2220/20* (2013.01)

(56) References Cited

U.S. PATENT DOCUMENTS

| 2018/0186227 | A1 | 7/2018 | Stephens et al. | |
|---|---|---|---|---|
| 2018/0233789 | A1* | 8/2018 | Iqbal | H01M 10/625 |
| 2018/0287112 | A1* | 10/2018 | Juventin | H01G 11/84 |
| 2018/0337435 | A1* | 11/2018 | Staudenmaier ... | H01M 10/6557 |
| 2019/0283562 | A1* | 9/2019 | Scholemann | B60L 50/66 |
| 2019/0337402 | A1* | 11/2019 | Günther | B60L 50/66 |
| 2021/0138886 | A1* | 5/2021 | Spielvogel | F28F 3/12 |
| 2022/0247012 | A1* | 8/2022 | Scholemann ....... | H01M 10/613 |

FOREIGN PATENT DOCUMENTS

| CN | 108270050 A | | 7/2018 | |
|---|---|---|---|---|
| CN | 108832054 A | | 11/2018 | |
| CN | 109361037 A | * | 2/2019 | ........ H01M 10/6551 |
| DE | 10 2014 226 566 B3 | | 4/2016 | |
| DE | 10 2016 108 849 B3 | | 4/2017 | |
| DE | 10 2016 115 037 A1 | | 2/2018 | |
| DE | 10 2016 120 826 A1 | | 5/2018 | |
| DE | 102017104360 A1 | | 9/2018 | |
| DE | 10 2018 106 399 A1 | | 9/2019 | |
| EP | 2453515 A1 | | 5/2012 | |
| EP | 3026753 A1 | | 6/2016 | |

OTHER PUBLICATIONS

International Search Report and Written Opinion for PCT/EP2020/070044 mailed Sep. 22, 2020 (12 pages; with English translation).

* cited by examiner

HOUSING ARRANGEMENT FOR RECEIVING ELECTRICAL STORAGE

CROSS-REFERENCE TO RELATED APPLICATIONS

This application is a national stage of, and claims priority to, Patent Cooperation Treaty Application No. PCT/EP2020/070044, filed on Jul. 15, 2020, which application claims priority to German Application No. 10 2019 210 400.2, filed on Jul. 15, 2019, which applications are hereby incorporated herein by reference in their entireties.

BACKGROUND

An electric vehicle includes, among other things, an electric machine as a drive source that is electrically connected to electrical storage means. In drive mode, the electric machine converts electrical energy into mechanical energy to drive the motor vehicle. The electrical storage means, which may also be referred to as battery or accumulator, are generally housed in a battery housing attached to the vehicle body at the underside of the vehicle.

A battery housing for an electric motor-driven vehicle is known from the generic DE 10 2016 120 826 A1. The battery housing comprises a tray part with a base and side walls integrally formed therewith, and a frame structure which surrounds the tray part on the outside and forms a hollow chamber.

From DE 10 2018 106 399 A1, a housing arrangement for accommodating electrical storage means for an electrically drivable motor vehicle is known. The housing arrangement comprises a tray assembly and a cover assembly. The tray assembly and/or cover assembly comprises a first formed part and a second formed part, which are made of flexibly rolled metallic material and are connected to each other so that they have a variable sheet thickness in longitudinal direction of the respective formed part.

A battery holder for a motor vehicle is known from DE 10 2016 108 849 B3, which has a base plate, a laterally surrounding frame and a cover. The base plate and the frame are manufactured integrally and trough-shaped from a three-layer laminated composite steel as a sheet metal forming component. An inner layer is formed of an acid-resistant steel alloy, and an outer layer is formed of a stainless steel alloy.

A battery box with lateral reinforcement is known from DE 10 2016 115 037 A1. The battery box comprises a sidewall structure with an attachment profile for connecting the battery box to the motor vehicle.

From DE 10 2014 226 566 B3 a battery box for a traction battery of an electrically operated vehicle is known. The battery box comprises side walls built from a strut construction.

A battery cooling arrangement for a motor vehicle is known from EP 3 026 753 A1. The battery cooling arrangement comprises a first and a second metal sheet, which are connected to each other by roll bonding. The two metal sheets are connected to each other in some areas and are spaced apart from each other in other areas, forming cavities, to form cooling channels.

SUMMARY

The present disclosure relates to a housing assembly for receiving electrical storage means for an electric motor-driven motor vehicle, and to a method of manufacturing such a housing assembly. The present disclosure includes a housing assembly for receiving electrical storage means for an electric motor-driven motor vehicle, which housing assembly can bear high loads and yet has a low weight. Furthermore, a method for producing such a housing assembly is provided.

According to the present disclosure, a housing assembly for accommodating electrical storage means for the drive of an electrically drivable motor vehicle is proposed, comprising: a frame comprising a plurality of frame elements made of a metallic material, with at least one of the frame elements having a variable sheet thickness over a longest length; a base which is connected to the frame in such a way that a sealed shell is formed, and a cover which is detachably connectable to the frame, wherein the base, the frame and the cover enclose a receiving space for electrical storage means. The base may include, e.g., an integral cooling structure through which a coolant may flow.

An advantage is that individual parts of the housing assembly, at least the frame elements, with respect to the material thickness of the respective part can be individually adapted to the requirements with respect to strength and rigidity. The dimensioning of the individual portions of the frame elements, and optionally also of the base and/or cover elements, can be carried out individually depending on the expected loads. By selectively reducing the thickness of the frame parts in areas subject to lower loads, material can be saved so that the housing assembly ultimately has a low weight without any loss in terms of mechanical properties, and can thus be manufactured cost-effectively. By selectively increasing the thickness of the frame parts in areas subject to higher loads, e.g., in crash-relevant areas, a higher strength can be achieved so that the housing assembly can take a high load without being destroyed. The base, the frame and the cover are at least connectable to each other, which in the context of the present disclosure is intended to include that some of said elements, or portions thereof, are rigidly connected to each other, and/or, that some of said elements, or portions thereof, are detachably connected to each other.

The frame elements may be produced separately from or integrally with the base and/or cover. In the separate configuration, the frame elements can first be produced individually and then connected to each other to form a circumferentially closed frame. In this regard, the frame elements may be connected to each other directly or optionally via corner elements. The individual frame elements may also each be respectively connected to the respective connecting edge of the base. The configuration with separate frame elements may also be referred to as a built housing assembly. In the integral configuration, at least a partial number of the frame elements are integrally formed with the base and/or with the cover. This includes, as one option, that all of the frame elements are integrally formed with one of the parts base or cover and jointly therewith form an integral tray form part or base form part, respectively. As a further option, two opposing frame elements may be formed integrally with the base, while the frame elements extending transversely thereto are formed integrally with the cover. In the assembled state of the base and the cover, the base frame elements formed on the base and the cover frame elements formed on the cover alternate over the circumference to form the circumferential frame together.

For all of the possibilities described, one, more or all of the frame elements may in turn be composed of individual sub-elements. The frame comprises a first frame element and a second frame element facing each other, and a third frame element and a fourth frame element facing each other and extending transversely to the first and second frame elements. For a particularly stable structure, one or more reinforcing elements may optionally be attached to at least a partial number of the frame elements from the outside and/or inside, for example by welded or screwed connections. The reinforcing elements may form one or more hollow chambers with the wall of the associated frame element. A reinforcing element may have a sheet thickness profile analogous to the variable sheet thickness profile of the associated frame element, or may have a constant sheet thickness. Further, the frame elements may have a flange portion for connecting the cover, which also has a stabilizing effect. The width of the reinforcing element, that is the extension from the frame element to a wall portion of the reinforcing element maximally spaced therefrom, and the width of a flange portion of the frame element may be at least substantially approximate to each other. In this way, both elements, that is the reinforcing element and the flange portion, can absorb respective forces in the event of a laterally acting impact. For example, the width of the flange portion may be at least half the width of the reinforcing element, e.g., at least two thirds of the width of the reinforcing element. In a specific configuration, the width of the flange portion may be between 0.8 times to 1.2 times the width of the reinforcing element.

The third and fourth frame elements may be shorter than the first and second frame elements. Preferably, an average thickness of the first and second frame elements deviates from an average thickness of the third and fourth frame elements, which deviation may be upward or downward.

In the context of the present disclosure, the "average thickness" of a variable thickness component may be, for example, the average thickness accumulated over the length of the respective component, or the average thickness between a largest and a smallest absolute thickness of the component. For components with a constant thickness over the length, the average thickness is equal to the nominal thickness.

In an embodiment, an average thickness of each of the first and second frame elements may be smaller than an average thickness of each of the third and fourth frame elements. This provides a higher load bearing capacity at the third and fourth sides of the arrangement than at the first and second sides. This embodiment is well suited if the third and fourth sides are located at the front and rear, respectively, in the longitudinal direction of the motor vehicle, so that the third and fourth frame elements can absorb correspondingly high loads in the event of a frontal crash. However, an embodiment is also possible in which the average thickness of the first and second frame elements is greater than that of the third and fourth frame elements.

According to a possible configuration, end portions of the first and second frame elements may have a smaller sheet thickness than at least an intermediate portion located between the end portions. Alternatively or in addition, end portions of the third and fourth frame elements may have a smaller thickness than at least an intermediate portion of the third and fourth frame elements located therebetween. This can be done to reduce weight without compromising strength, since the end portions are located at corner regions of the frame that are already quite stiff. Further, the third and fourth frame elements may each have a constant sheet thickness over at least 0.5 times the element length, preferably at least 0.75 times the element length.

The sheet metal elements of the frame are made of a metallic material, e.g., a steel material or light metal, such as aluminum or an aluminum alloy. For high strengths, hardenable steel is preferably used, e.g., a manganese-boron alloyed quenched and tempered steel, such as 17MnB3, 22MnB5, 26MnB5 or 34MnB5, although other steel grades are equally possible. The frame may be manufactured, for example, in such a way that the individual sheet metal elements are first produced separately and then joined to each other by material bonding, for example by welding. Insofar as the frame elements are made from a hardenable steel material and are to be subjected to forming operations, this may be carried out by hot forming. For this, the respective component is first heated to austenitizing temperature, then placed in the hot forming tool in a hot state, formed therein and rapidly cooled so that a martensitic structure is produced.

The starting material, that is an unhardened sheet metal element for the frame may have a tensile strength of at least 500 MPa. The finished, that is hardened, component may have a final tensile strength of at least 900 MPa, preferably at least 1300 MPa. Alternatively, a light metal such as aluminum or an aluminum alloy may be used for the frame elements. This also applies to the base and/or the cover, although in principle the use of fiber-reinforced plastic is also possible here.

For a particularly rigid structure, at least one web element may be provided which extends between the first and second frame portions and which is connected to the base and/or to the two frame portions. The web element separates two chambers from each other, in each of which an electrical storage means is insertable. Depending on the number and size of the storage means and/or the desired overall rigidity of the battery housing, two, three or more web elements may also be provided.

According to a possible configuration, the first frame element and the second frame element may each comprise at least one connecting portion for connecting the at least one web element. The connecting portion is preferably thinner than adjacent intermediate portions of the first and second frame elements.

Alternatively or in addition, the base can also have a connecting portion for connecting the at least one web element, which is e.g., thinner than the portions of the base adjacent thereto. The connecting portions run transversely to the longitudinal extension of the battery housing, and preferably over the entire width of the base. If a plurality of web elements are used, a corresponding plurality of connecting portions may be provided which extend parallel to each other. A web element is respectively supported on the upper side of an associated connecting portion and can be connected to the base along the connecting portion, for example in a material bonding manner by welding, without being limited thereto.

According to one embodiment, the base may be composed of a plurality of sheet metal elements. The sheet metal elements may each have a uniform or variable sheet metal thickness over the length of the respective sheet metal element. The sheet metal elements are preferably made of metallic material and may be joined to each other by material bonding, e.g., by welding. A plurality of sheet metal elements may be provided in a plane, for example one, two or three sheet metal elements arranged side by side and joined together along adjacent longitudinal edges of the sheet metal elements and forming a sheet metal element group. Alternatively or in addition, two sheet metal elements may be arranged one above the other, which may be joined together by a rolling process, e.g., by roll bonding. The end portions of the base may have a greater thickness than at least one intermediate portion located therebetween. Thus, a frame-like thickness structure is formed so that the base of the housing arrangement has a high rigidity.

According to an embodiment, the base has an integrated cooling structure through which a coolant can flow. For this, the base is preferably made of several aluminum sheets joined together by roll bonding. The aluminum sheets are connected to each other by rolling in connecting areas, wherein areas lying outside the connecting areas are subsequently pressurized so that respectively hollow areas and/or cooling channels are formed. A total cooling area formed by the hollow regions is at least 0.2 times the total area of the base, e.g., at least 0.3 times, and optionally also at least 0.5 times the total area of the base. In this context, the total cooling area can be determined, for example, in the joining plane between the upper and lower sheet metal elements. The total area of the base may refer, for example, to the projection face in a plan view or to the net bearing face on which electrical storage means can be placed. Due to the high total cooling area in relation to the total area of the base, a particularly high cooling capacity is achieved, which is beneficial for the service life of the storage means. According to a possible specification, the aluminum sheets may be configured to be spaced apart from each other in second hollow regions forming a reinforcing structure. In this case, it is provided that the first and second hollow regions are formed separately, that is, are not fluidically connected to each other. In this specification with two hollow regions it is provided that only the first hollow regions are traversed by coolant, while the second hollow regions are untraversed and provide a structural mechanical improvement in terms of crash properties, compressive strength and noise vibration harshness (NVH) properties. Preferably, the hollow regions of the base are formed in only one of the two superimposed sheet metal elements or sheet metal element groups, that is, one sheet metal element remains planar while the other sheet metal element is formed. In this regard, the planar sheet metal element may have a greater thickness and/or greater strength and/or greater yield strength than the formed sheet metal element. For example, the thickness of the formed sheet metal element can be less than 0.9 times the thickness of the planar sheet metal element. In this respect, the thickness of the flat sheet metal element may be, for example, between 0.5 and 2.5 mm, while the thickness of the formed sheet metal element may be, for example, between 0.3 and 2.0 mm.

The process steps of rolling and blowing restrict the quality of the material to be processed due to the rolling force acting on the material and the blowing pressure. In this regard, the tensile strength of the base may be, for example, above 60 MPa and/or below 900 MPa. Alternatively or additionally, some, several or all of the aluminum sheets of the base may have a yield strength (Rp0.2) of at least 30 MPa and at most 400 MPa. Accordingly, it is favorable if the material selection for the frame is such that the frame has a suitably high tensile strength, which may, for example, be in excess of 900 MPa. Thus, a frame structure with higher strength can compensate for a base with lower strength, so that the battery housing as a whole can withstand the loads even in the event of a crash.

For a high cooling capacity, it is provided in particular that the two or more base elements to be joined together have a high thermal conductivity of, e.g., greater than 100 W/mK. The thermal expansion coefficient of the material may be, for example, greater than 20 $(10^{-6}/K)$. In combination with a frame made of a steel material, shear loading may occur during temperature changes at the junction of the base to the frame as a result of different thermal expansion coefficients. This load can be taken into account in a sufficient dimensioning of a hybrid connection technique. For this, the two components may be adequately protected against the ingress of moisture with a sealant and at the same time mechanically decoupled.

Roll bonding as a manufacturing process for producing the base offers various advantages. Depending on the application, different aluminum alloys from soft to high strength can be used. With higher grades, there is a strength advantage, which has a favorable effect on the crash behavior. The connections for the coolant can be configured to suit the application, e.g., also horizontally to the cooling plate. Roll bonding also allows very high burst pressures of over 10 bar and/or up to 20 bar, depending on the material, thickness variation and geometry. Another advantage is that the strength of a roll-bonded cooling base is independent of temperature. In addition, there is a high degree of flexibility in the design of the base, which can be made in one piece (with only one upper and lower sheet metal element) or in several pieces (made from a group of upper and lower sheet metal elements). The channel structure can be formed on one side or on both sides. With respect to the joining technique, a mixed steel construction is also possible, for example by using friction welding elements and/or adhesives. Compared to soldered plates, roll bonding results in strength advantages that allow for a smaller plate thickness, which leads to weight savings. Furthermore, cooling channels produced by roll bonding have a clean channel inside compared to soldered joints, which has a favorable effect on the service life of the cooling system.

In the connected state of the frame with the base, a shell is formed which is preferably sealed in itself. Leakage of battery fluid from the shell or penetration of dirt into the housing is effectively prevented. Due to the design of the base and the frame in the described form, the shell has a self-supporting structure with a high rigidity and strength.

In an example, the surface of the base facing the cover is flat, at least in the area for receiving the battery modules, which means that the thickness changes of the base elements and/or the cooling channel structure are directed outwardly here. This provides a flat support surface for the battery modules.

The cover can be designed in one or more parts, in each case optionally with variable or uniform material thickness.

For all of the above elements of the base and/or the frame and/or the cover, it is to be understood that they may be made of flexible rolled strip material.

BRIEF SUMMARY OF THE DRAWINGS

Exemplary embodiments are explained below with reference to the drawing figures, which show:

FIG. 1B: the frame and base of the housing assembly of FIG. 1A in perspective exploded view, with the material thickness over the length of a first and second frame element drawn in;

DESCRIPTION

FIGS. 1A to 4C, which will be described jointly below, show a housing assembly 2 according to the disclosure, in which electrical storage means 3, 3' can be accommodated, in a first embodiment. Such a housing arrangement 2 can be connected to the body of a motor vehicle. The electrical storage means 3, 3' serve to store electrical energy with which an electric motor of the electrically drivable motor vehicle can be supplied with current; they can also be referred to as battery modules.

Figure 1A:
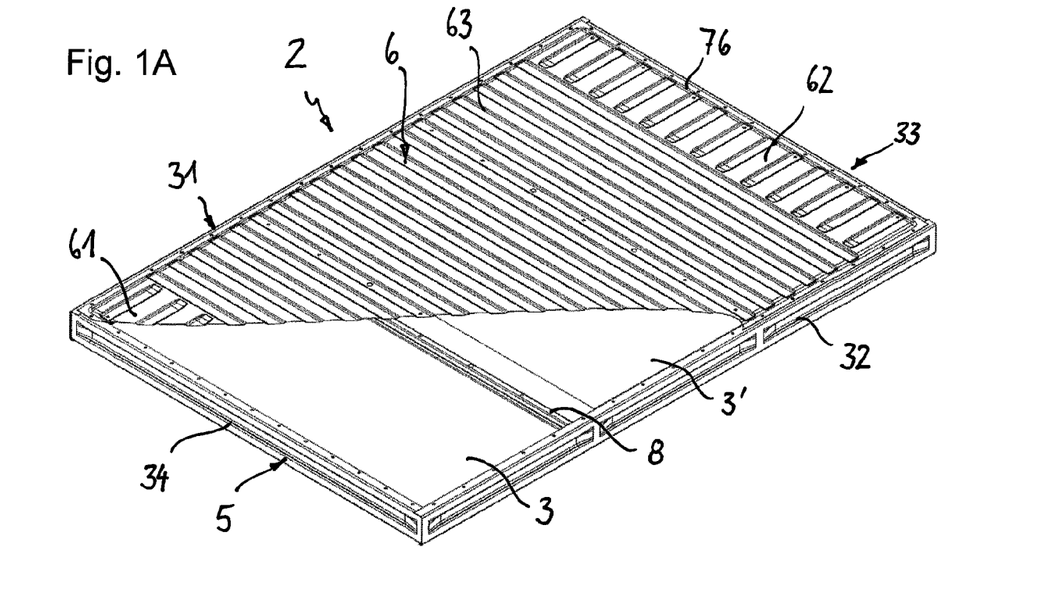
FIG. 1A: a housing assembly for accommodating electrical storage means in perspective view, partially sectioned.
Figure 1B:
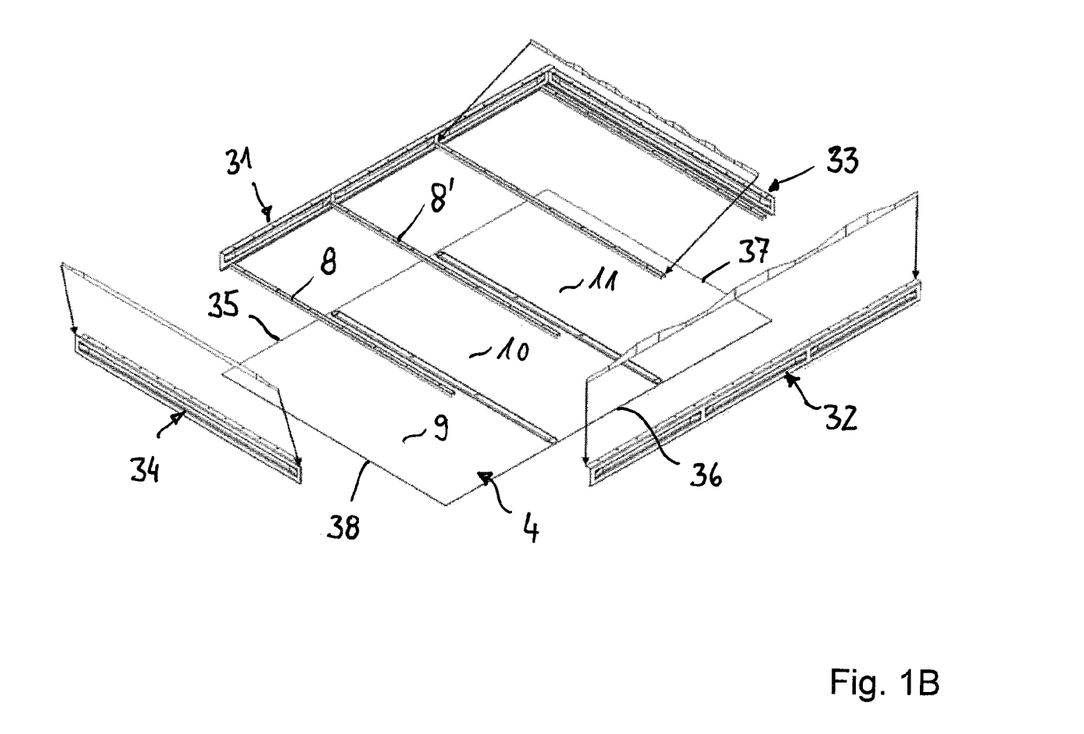

The housing assembly 2 has a base 4, a frame 5 and a cover 6. In the present embodiment, the base 4 and the frame 5 are sealingly connected to each other, for example by means of welding or by means of screw connections, and in the connected state jointly form a shell for accommodating the storage means 3. The cover 6 is detachably connectable to the frame 5, for example by means of screw connections (not shown). Between two opposing frame parts, web elements 8, 8' are optionally provided, which are firmly connected to the base 4 and/or the frame parts 31, 32, for example by welding or screw connections (not shown).

Further details of the base, frame and cover units are given below.

The base 4 may be composed of one or more elements. In the present case, the base comprises three base sheet metal elements 9, 10, 11 extending transversely to the longitudinal extension of the battery housing. One or more of the base sheet metal elements may have a variable thickness along their respective lengths. It will be understood that, depending on the respective structural conditions of the battery housing, a one-piece base or a base composed of two, four or more base sheet metal elements is also possible. Insofar as one or more of the base elements 9, 10, 11 has a variable thickness, this is preferably produced by flexible rolling.

The frame 5 comprises four individual frame elements, which can be produced separately and then connected to each other and to the base 4, respectively. In this way, a built shell arrangement is formed. The individual frame elements are preferably each made of flexibly rolled steel sheet, so that they have a variable sheet thickness over the length of the respective element. The frame elements may also be referred to as frame parts.

Specifically, it is provided that the frame 5 comprises a first frame element 31 and a second frame element 32 facing each other, and third and fourth frame elements 33, 34 facing each other and extending transversely to the first and second frame elements. The frame 5 is connected to the base 4 such that the first frame element 31 is attached to a first edge region 35 of the base 4 and the opposite second frame element 32 is correspondingly attached to a second edge region 36 of the base. The third frame element 33 is attached to a third edge region 37 of the base 4. Correspondingly, the fourth frame element 34 opposite thereto is attached to a fourth edge region 38 of the base 4.

The first and second frame elements 31, 32 have a variable thickness D31 over the length L31 and are in particular designed alike to one another, i.e. have the same sheet thickness profile over the length. The third and fourth frame elements 33, 34 also have a variable thickness D33 over the length L33, and the sheet thickness profile may be the same or different.

It is provided in the present embodiment that an average thickness D31$m$ of each of the first and second frame elements 31, 32 is smaller than an average thickness D33 of each of the third and fourth frame elements 33, 34. Thus, a higher load bearing capacity at the first and second sides 35, 36 of the housing is provided than at the third and fourth sides 37, 38.

Figure 2A:
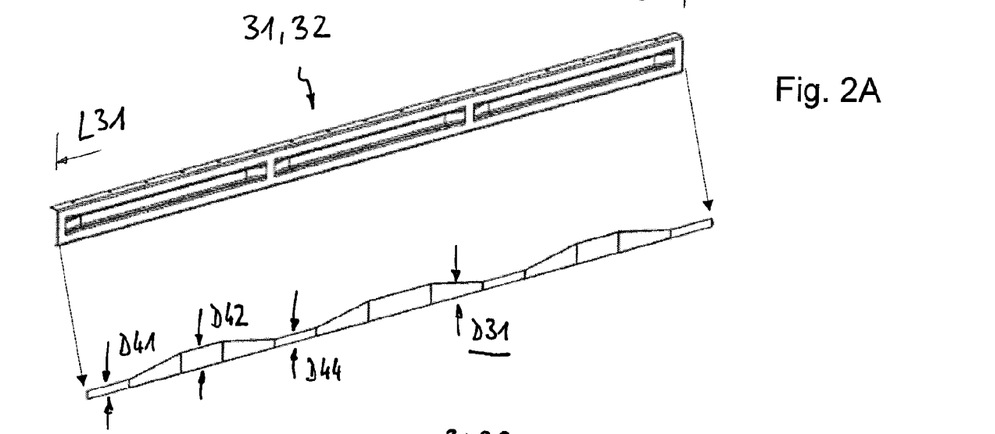
FIG. 2A: a first frame element of the housing assembly of FIG. 1A as a detail with schematically applied thickness profile.
Figure 2B:
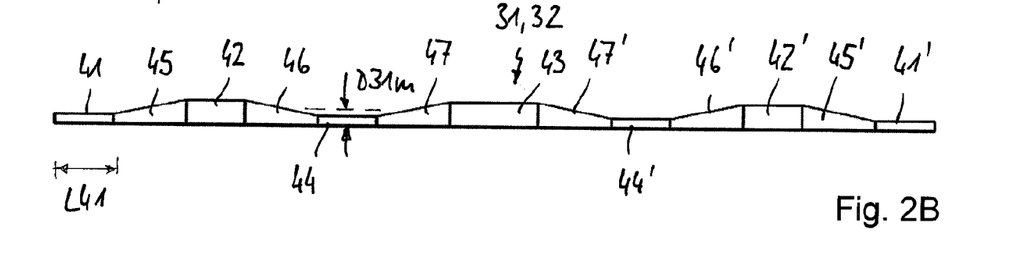
FIG. 2B: the thickness profile of the first frame element of FIG. 1A and FIG. 2A respectively as a detail.

The first and second frame elements 31, 32 respectively are shown as a detail in FIGS. 2A and 2B with projection of the side face, respectively sheet thickness profile along the length. Insofar as the two frame elements 31, 32 have the same design, the details described for one of the elements also apply to the other. It can be seen that the first and second frame elements 31, 32 respectively have end portions 41, 41' with a reduced thickness D41. The thickness D41 of the end portions 41, 41' may be, for example, between 1.0 mm to 2.0 mm, and the length L41 may be, for example, between 20 mm and 200 mm.

Thicker portions 42, 42', 43 and thinner portions 44, 44' are formed between the end portions 41, 41' and are arranged alternately. Transition portions 45, 45', 46, 46', 47, 47' with continuously variable sheet thickness are respectively formed between the thin end portions 41, 41' and the thicker portions 42, 42' adjacent thereto, and between the thicker portions 42, 42' and the thinner portions 44, 44' adjacent thereto, and between the thinner portions 44, 44' and the central thick portion 43 arranged therebetween. In the present embodiment, the first and second frame elements 31, 32 are configured to have a flat surface 48 facing outwardly, that is, the variation in sheet thickness D31 is directed inwardly. However, it will be understood that the variable sheet thickness variation could also be directed outwardly, or to either side. The thicker reinforcing portions 42, 42', 43 are arranged in the overlapping region with the battery modules to be inserted into the individual chambers. They have a greater thickness D42, than the end portions 41, 41' and the portions 44, 44'. The thinner portions 44, 44' are arranged in the region of the webs 8, 8' which are attached here in the assembled state. The thinner portions 44, 44' may have a sheet thickness of, e.g., 0.5 mm to 1.5 mm. The reinforcing portions 42, 42', 43 may have a thickness D42 of 1.0 mm to 3.5 mm, for example.

Figure 3A:
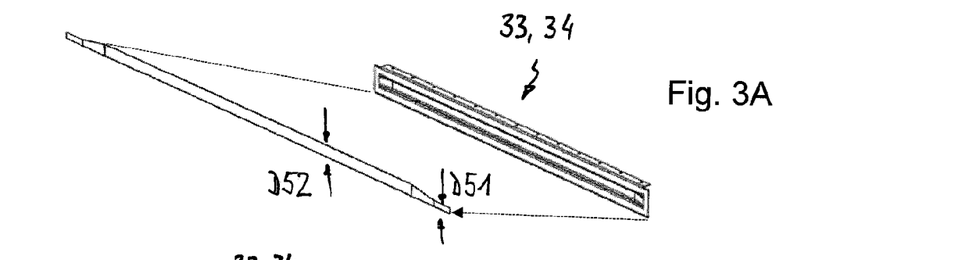
FIG. 3A: a third frame element of the housing assembly of FIG. 1A as a detail with schematically applied thickness profile.
Figure 3B:
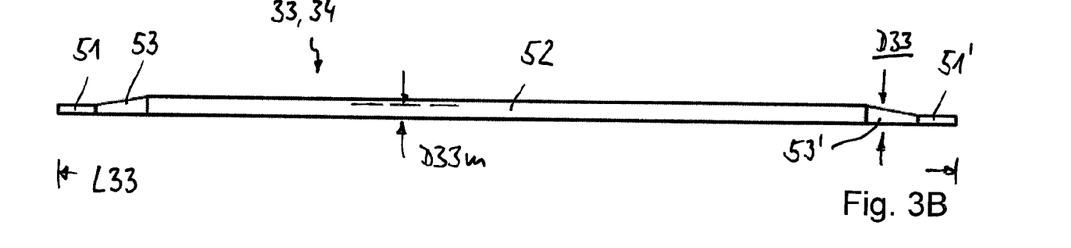
FIG. 3B: the thickness profile of the third frame element of FIG. 1A and FIG. 3A respectively as a detail.

The third respectively fourth frame element 33, 34 is shown as a detail in FIGS. 3A and 3B with projection of the side surface, respectively sheet thickness profile along the length. It can be seen that the end portions 51, 51' of the third and fourth frame elements 33, 34 have a smaller thickness D51 than an intermediate portion 52 located therebetween. This is possible without sacrificing strength to reduce weight, since the end portions 51, 51' are located at the corner regions of the frame 4 which are in any case quite stiff. The intermediate portion 52 is many times longer, e.g., more than 10 times longer, than the end portions 51, 51'. Between the end portions 51, 51' and the intermediate portion with constant thickness, transition portions 53, 53' with continuously variable thickness are formed respectively. The thinner end portions 51, 51' may have a sheet thickness of 0.5 mm to 1.5 mm. The intermediate reinforcing portion 52 may have a thickness D52 of 1.0 mm to 3.5 mm, for example.

Figure 4A:
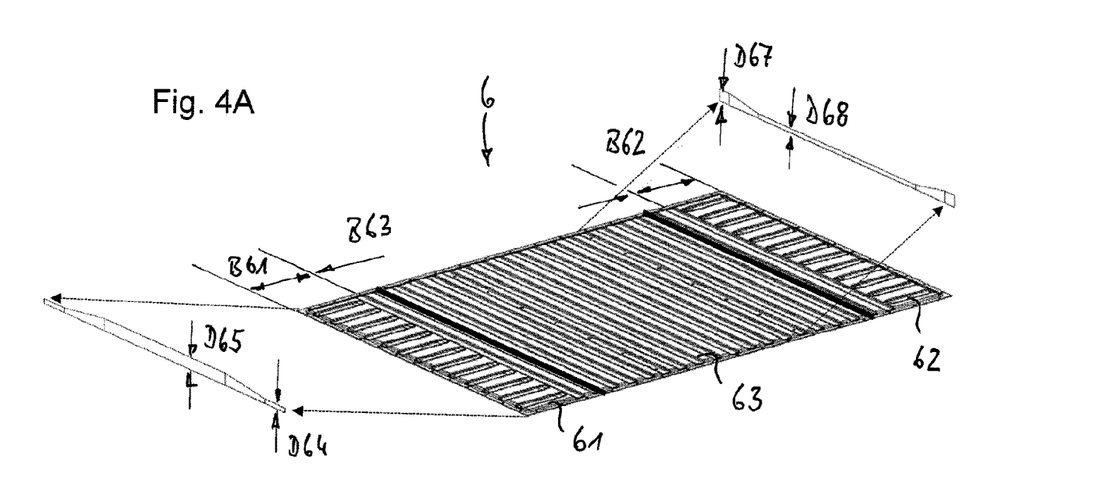
FIG. 4A: the cover of the housing assembly of FIG. 1A with schematically applied thickness profile of the cover elements.
Figure 4B:
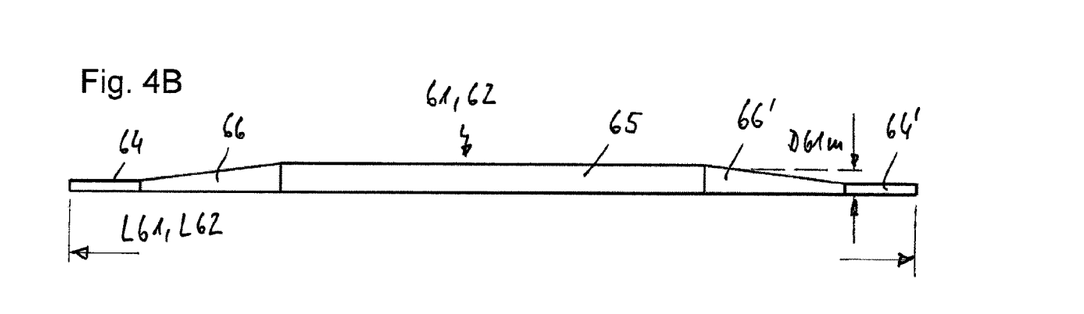
FIG. 4B: the thickness profile of the first and second cover elements of FIG. 1A and FIG. 4A, respectively.
Figure 4C:
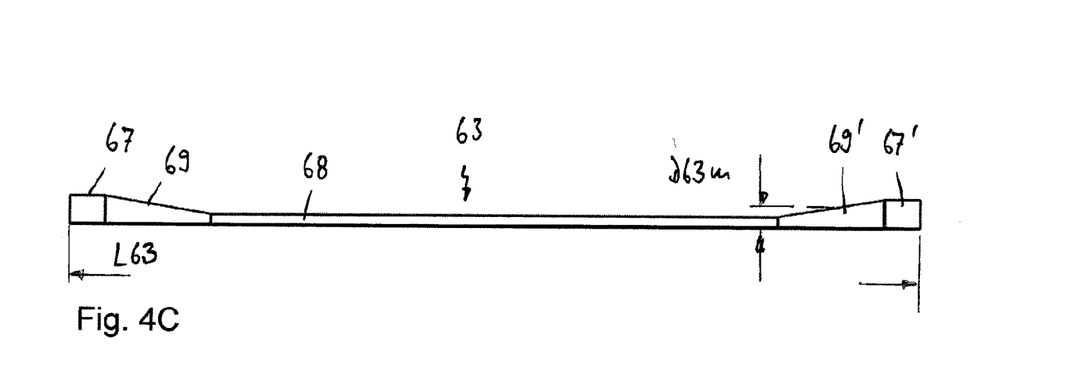
FIG. 4C: the thickness profile of the third cover element of FIG. 1A and Figure, respectively.

Referring to FIGS. 4A to 4C, details of the cover 6 can be seen. In the present embodiment, the cover 6 includes a first lateral cover element 61, a second lateral cover element 62 and a cover element 63 arranged therebetween. The three cover elements each have a variable thickness along their length.

It is provided that the lateral cover elements 61, 62 have an average thickness D61m which is greater than the average thickness D63m of the third cover element 63. Further, the intermediate cover element 63 has a width B63 which is several times greater than the width B61, B62 of the lateral elements 61, 62.

The first and second cover elements 61, 62 each have thin end portions 64, 64' and a reinforcing portion 65 of greater thickness D65 therebetween. Transition portions 66, 66' of variable thickness are formed between the reinforcing portion 65 and the end portions 64, 64' respectively. Furthermore, connecting regions 60, 60' can be seen in the cover 6 which extend parallel to the webs 8, 8' and which are releasably connectable to the webs by suitable connecting means, such as screws.

The central cover element 63 has an inverted sheet thickness profile with thick end portions 67, 67' and thin portion 68 of lesser thickness D68 arranged therebetween. Transition portions 69, 69' of variable thickness are formed between each of the thin portion 68 and the end portions 67, 67'.

Figure 5:
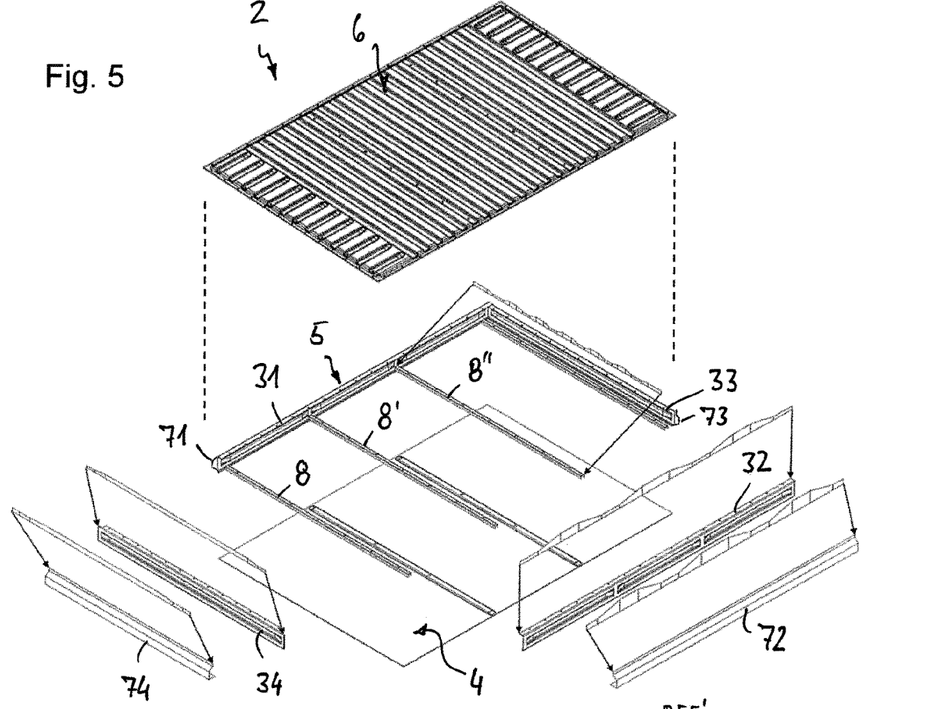
FIG. 5: a housing assembly according to the invention for accommodating electrical storage means in a perspective exploded view in a modified embodiment with reinforcing elements.

FIG. 5 shows a housing arrangement 2 according to the disclosure in a modified embodiment. This widely corresponds to the embodiment according to FIGS. 1A to 4C, so that reference is made to the above description with regard to the common features. In this context, identical or corresponding components are provided with the same reference signs as in the above FIGS. 1A to 4C.

The only difference is that in the present embodiment reinforcements 71, 72, 73, 74 are placed on the frame portions 31, 32, 33, 34 from outside and are connected therewith in a suitable manner. The connection can be effected in a material connected manner by welding and/or in a force fitting manner by screws.

Figure 6A:
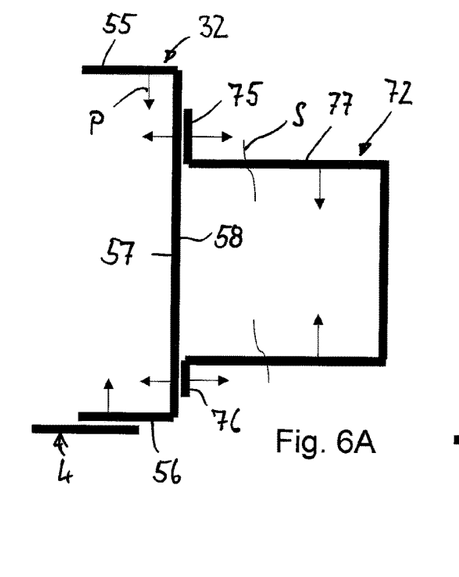
FIG. 6A: schematically a cross-section through a frame portion with drawn-in orientation of the variable thickness profile, in a first embodiment.
Figure 6B:
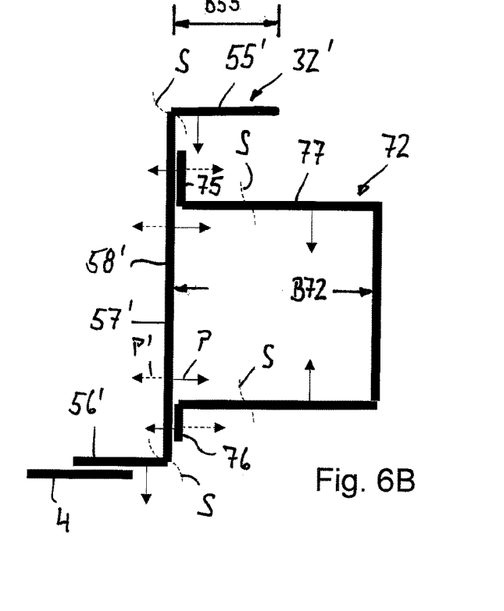
FIG. 6B: schematically a cross-section through a frame portion with drawn-in orientation of the variable thickness profile, in a second embodiment.
Figures 6C, 7A:
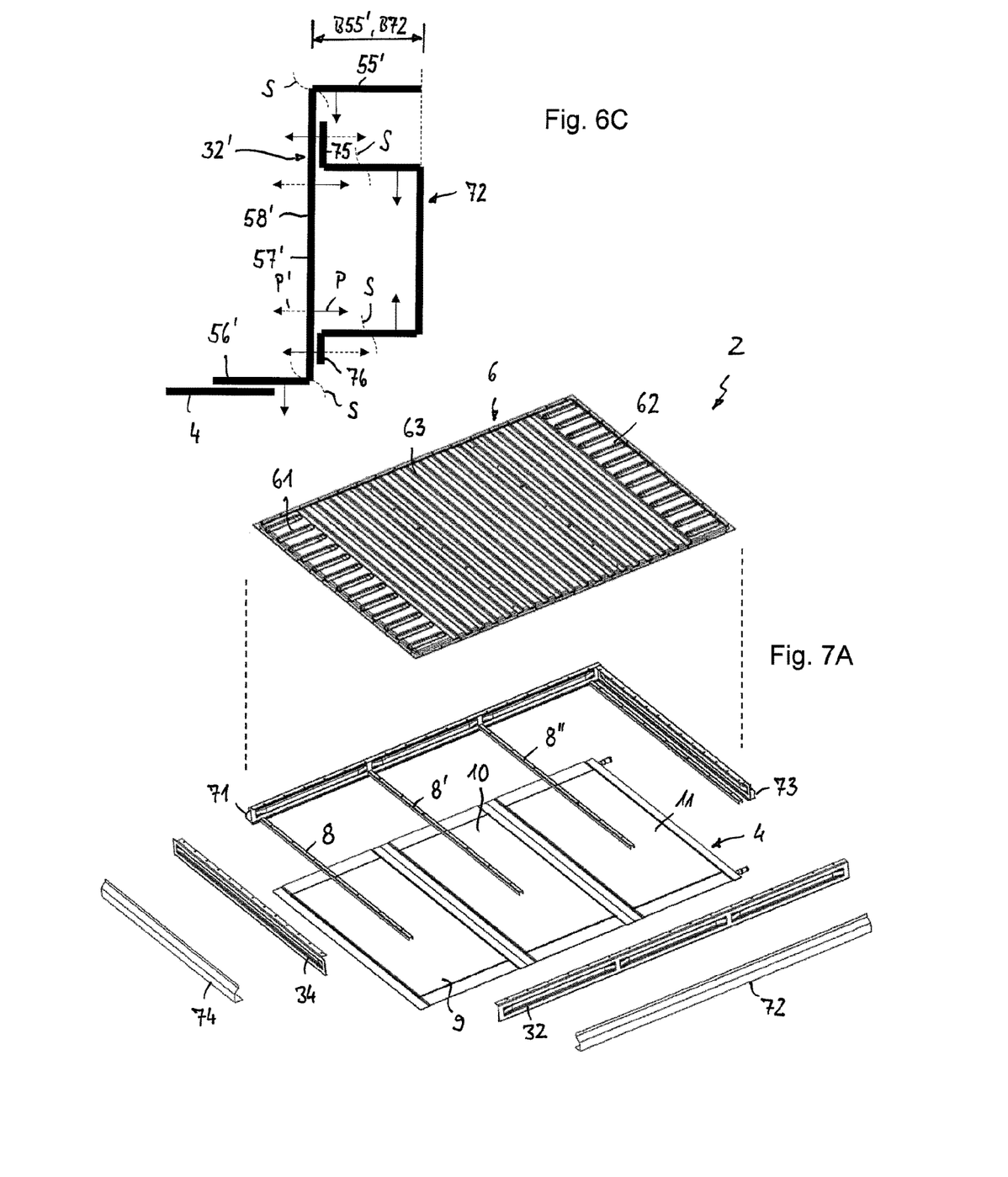
FIG. 6C: schematically a cross-section through a frame portion with drawn-in orientation of the variable thickness profile, in a third embodiment.
FIG. 7A: a housing assembly for accommodating electrical storage means in a further embodiment in a perspective exploded view obliquely from above.

FIGS. 6A, 6B and 6C show various ways in which the thickness variations of at least a sub-number of the frame elements 31, 32, 33, 34 and reinforcing members 71, 72, 73, 74 may be configured. The arrows indicate in which direction the sheet thickness variation is variable. Representative of several frame or reinforcing elements, only one is shown and described here respectively.

In FIG. 6A, the frame element 32 has a C-shaped profile, that is, the upper and lower flange portions 55, 56 are both bent in the same direction from the wall portion 57, facing inwardly with respect to the housing. It can be seen that the frame element 32 has an outwardly facing flat surface 58, that is, the change in sheet thickness D31 is inwardly directed. By this configuration, a cover 6 and/or base 4 can be easily joined to the flat joining face 58 of the frame element 32. The reinforcing element 72 has a U-shaped profile, with connecting flanges 75, 76 bent off at the ends of the legs. It can be seen that the connecting flanges 75, 76 feature an outwards orientated change in sheet thickness and an inner flat connecting face, respectively, which can be accordingly connected to the flat outer face 58 of the frame element 32. In the region of the legs, the direction of the variable sheet thickness changes from outwardly directed to inwardly directed, which is schematically represented by a curved line S. The change in orientation of the sheet thickness profiles results in a flat outer face 77 of the legs, allowing easy connection to the vehicle body in this region.

In the embodiment shown in FIG. 6B, the frame element 32' has an S-shaped profile, that is, the upper and lower flange portions 55', 56' are both bent in opposite directions from the wall portion 57'. In this case, the lower flange portion 56' is bent inwards for connecting the base 4, while the upper flange portion 55' is bent outwards for connecting the cover 6. The frame element 32' may have an inwardly facing flat surface 58', that is, the change in sheet thickness D31 is directed outwardly (solid arrows P). In this case, the base 4, which may optionally be designed as an integrated cooling base, may have incorporated embossments which are designed so as to correspond to the sheet thickness profile of the lower flange portion 56'. Alternatively, the frame element 32' may have an outer flat surface, that is to say that the variation in sheet thickness D31 is directed inwards (dashed arrows P'). In this case, the base 4 may have a flat connecting face for connecting to the lower flange portions 56'.

The reinforcing element 72 has a U-shaped profile, with connecting flanges 75, 76 bent at the ends of the legs. Depending on the orientation of the variable thickening of the frame element, the change in the sheet thickness of the connecting flanges 75, 76 of the reinforcing element 72 is formed so as to correspond therewith. That is, when the outer face of the frame element 32' is planar, the connecting face of the flange portions 75, 76 is also planar, and vice versa, when the thickness of the outer face of the frame element 32' is variable, the connecting face of the flange portions 75, 76 is also variable. In the region of the legs, the reinforcing element 72 has a flat outer surface 77 and variable inner surface, respectively.

The ratio of the width B72 of the reinforcing member 72, that is the extension from the wall portion 58' of the frame element 32' to a wall portion of the reinforcing member maximally spaced therefrom, to the width B55' of the flange portion 55' of the frame element 32' is in the present embodiment slightly less than two (B72/B55'<2.0).

The embodiment according to FIG. 6C largely corresponds to the embodiment according to FIG. 6B, the description of which is referred to in this respect. The same and/or corresponding details are provided with the same reference signs. The only difference is that the width B72 of the reinforcing element 72 is adapted to the width B55' of the flange portion 55', so that the outer wall of the reinforcing element 72 lies approximately in one plane with the outer edge of the flange portion 32'. It will be understood, however, that other embodiments are possible. For example, the width B72 of the reinforcing element 72 may be configured between 0.8 times to 1.2 times the width B55' of the flange portion 32'.

FIGS. 7A, 7B and 8A, 8B show a housing arrangement 2 according to the disclosure in a further embodiment. This largely corresponds to the embodiment according to FIG. 5 and FIGS. 1A to 4C, respectively, so that reference is made to the above description with regard to the common features. In this context, identical and/or corresponding components are provided with the same reference signs as in the above FIGS. 1A to 6C. The orientation of the variable sheet thicknesses of the frame elements and reinforcing elements can, for example, be designed according to FIG. 6A or 6B.

Figure 7B:
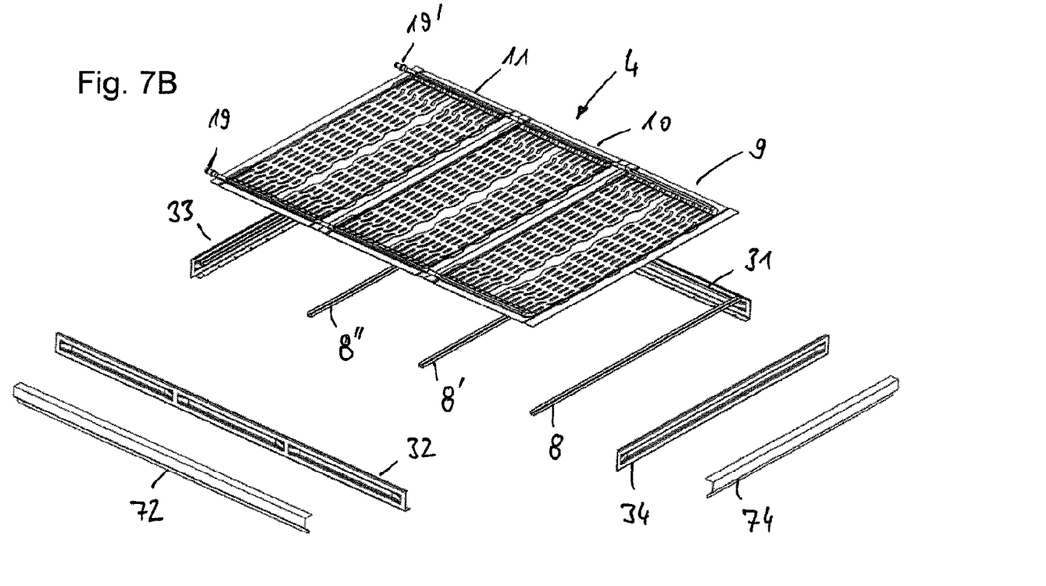
FIG. 7B: the housing assembly according to FIG. 7A in a perspective exploded view from below (without cover)

A particular feature of the present embodiment is the configuration of the base 4, which has an integral cooling structure 12 through which a coolant can flow. Specifically, the base 4 may be made of a plurality of aluminum sheets joined together by roll bonding. An upper and lower aluminum sheet 9, 9'; 10, 10'; 11, 11' are joined together by roll bonding processes in joining regions 13. Regions 14 lying outside the joining regions 13 are then pressurized so that cavities and/or cooling channels are formed accordingly.

The tensile strength of the base 4 respectively a base element 9, 9'; 10, 10'; 11, 11' may be, for example, less than 900 MPa. The frame 5 respectively a frame element 31, 32, 33, 34 may have a tensile strength higher than 900 MPa. Thus, a frame structure 5 having a higher strength can compensate for a base 4 having a lower strength, so that the aforementioned features together result in a stable battery housing 2 with good cooling properties.

For a high cooling capacity, two or more base elements 9, 9'; 10, 10'; 11, 11' to be connected to each other may have a high thermal conductivity, e.g., greater than 100 W/mK. For example, the thermal expansion coefficient of the material may be greater than 20 ($10^{-6}$/K). In combination with a frame 5 made of a steel material, temperature changes may lead to shear loads at the connection point of the base 4 to the frame 5 as a result of different thermal expansion coefficients. By means of a suitable connection, the two components can be adequately protected against moisture penetration and at the same time mechanically decoupled by using a sealant.

Figures 8A, 8B:
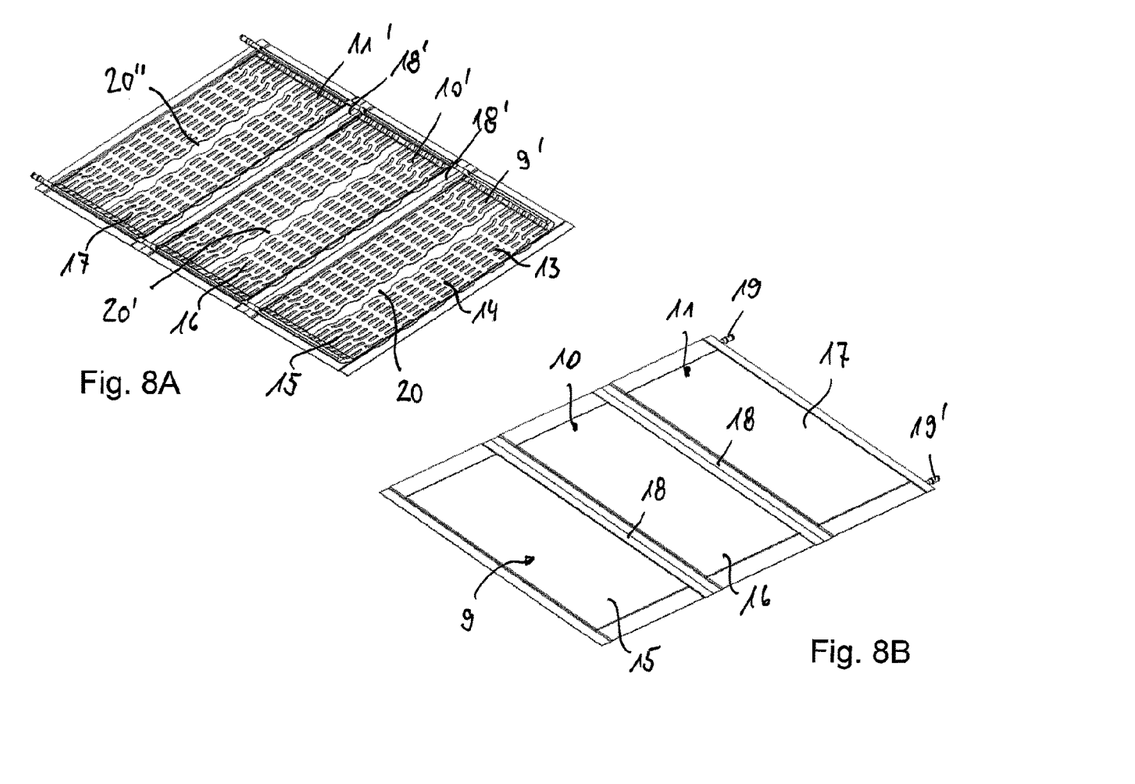
FIG. 8A: the base of the housing assembly shown in FIG. 7A as a detail from obliquely below.
FIG. 8B: the base of the housing assembly according to FIG. 7A as a detail from obliquely above.

As can be seen in particular from FIGS. 8A and 8B, the base has three cooling portions 15, 16, 17 which are separated from each other by web portions 18. In this respect, it is generally preferable that the number of cooling portions 15, 16, 17 corresponds to the number of storage elements 3. The web elements 8, 8' are connected to the web portions 18, 18' of the base between the storage elements 3. Connectors 19, 19' for circulating coolant through the hollow regions 14 are further apparent.

The base elements 9, 9'; 10, 10'; 11, 11' may have optional second hollow regions 20, 20', 20" in which the base sheets joined onto each other are respectively configured to be spaced apart from each other. These second hollow regions 20, 20', 20" are separated from the first hollow regions 14 and serve to increase the rigidity of the base 4 and/or to improve the crash properties, compressive strength and noise vibration harshness properties (NVH properties).

Figure 9:
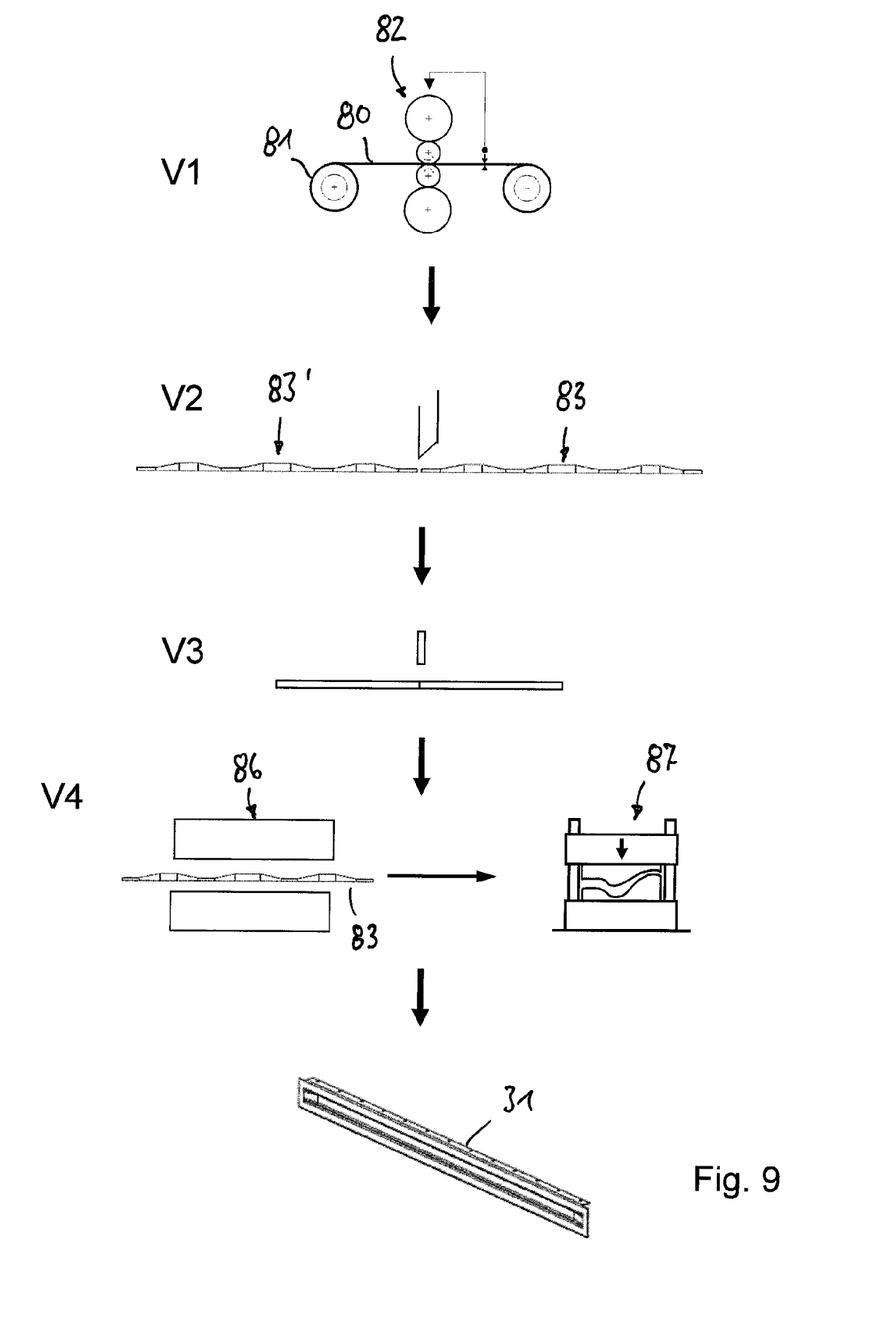
FIG. 9: a method for producing a frame element and/or cover element for a housing assembly in an embodiment.

FIG. 9 shows an example of a method according to the disclosure for producing a frame element 31 for a housing arrangement 2 according to the disclosure in a possible embodiment.

In process step V1, the strip material 80, which is wound to a coil 81 in the initial state, is processed by rolling, namely by means of flexible rolling. For this, the strip material 80, which has a substantially constant sheet thickness along its length before flexible rolling, is rolled by rollers 82 in such a way that it acquires a variable sheet thickness along the rolling direction. The strip material 80 may optionally be pre-coated with a coating that is particularly protective against rust, such as a coating comprising aluminum or zinc. During rolling, the process is monitored and controlled, using data obtained from a sheet thickness measurement as an input signal to control the rollers 82. After flexible rolling, the strip material 80 has respective regions extending transversely to the rolling direction and having different thicknesses. The strip material is rewound into a coil after flexible rolling, so that it can be fed to the next process step. In process step V2, the flexibly rolled steel strip is separated to form sheet metal blanks 83, 83'. In a subsequent optional process step V3, two or more sheet metal blanks 83, 83' can be joined together to form a blank group 84, e.g., welded together. In a subsequent process step V4, the sheet metal blank 83, 83' or the blank group, respectively, is formed by hot forming. The hot forming comprises the sub-steps of heating in a furnace 86, transfer to the hot forming tool 87, where the sheet metal blank 83 is formed into a frame element 31 and hardened.

Figure 10A:
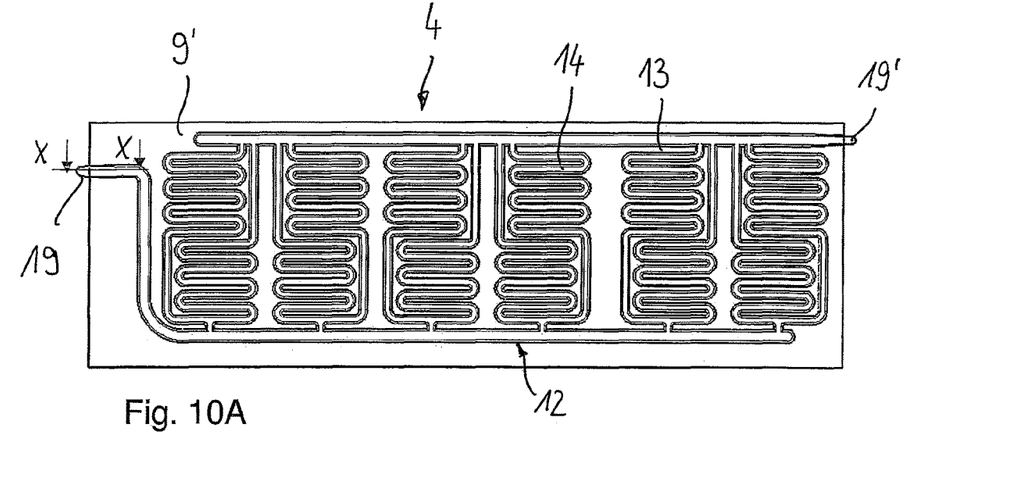
FIG. 10A: the base for a housing assembly according to FIG. 7A in a modified embodiment as a detail from below.
Figure 10B:
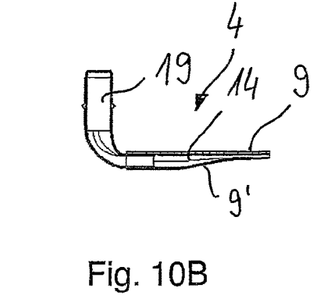
FIG. 10B: a detail of the base of FIG. 10A as shown in section line X-X

FIGS. 10A and 10B, which are described together below, show a base 4 for a housing arrangement according to FIG. 7A in a modified embodiment. This widely corresponds to the embodiment according to FIGS. 8A and 8B, to the description of which reference is made with regard to the common features. The same and/or corresponding details are marked with the same reference signs as in the above Figures.

Figure 11A:
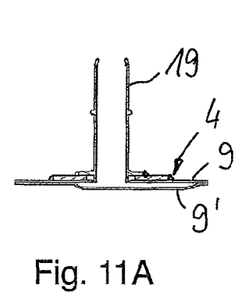
FIG. 11A: a connector for a base in a modified first embodiment.
Figure 11B:
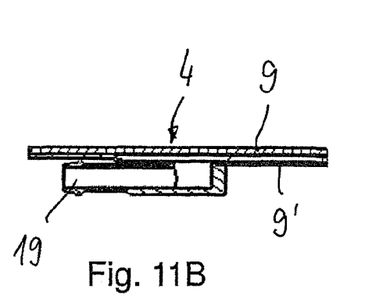
FIG. 11B: a connector for a base in a modified second embodiment.

A special feature of the present embodiment according to FIGS. 10A, 10B is that the base 4 is composed only of two aluminum sheets 9, 9' joined together by roll bonding. The cooling structure 12 is clearly visible, which has been produced by pressurizing the regions 14 of the lower aluminum sheet 9' lying outside the connecting region 13, in which cavities and/or cooling channels are formed accordingly. Connectors 19, 19' for circulating coolant through the hollow regions 14 are also visible. One connection member 19 is for supply and the other connection member 19' is for return. The connection member 19 for supply can be seen in detail in FIG. 10B, it being understood that the connector 19' for return can be configured accordingly. A particular feature is that the end of the cooling channel 14 to which the connection member 19 is connected is arranged in a plane with the cooling structure. An alternative embodiment of an end portion from the cooling channel 14 and connector 19, respectively, is shown in FIG. 11A. Here, the end of the channel pierces the base 4 upwards. Another alternative embodiment of an end portion of the cooling channel 14 and connection 19, respectively, is shown in FIG. 11B. Here, the end of the channel is placed beneath, so that the connector 19 is also arranged below the base 4.

Figure 12A:
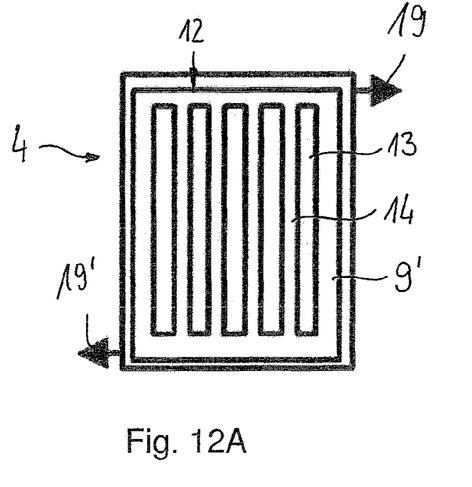
FIG. 12A: a base for a housing assembly according to FIG. 7A in a further embodiment as a detail from below.
Figure 12B:
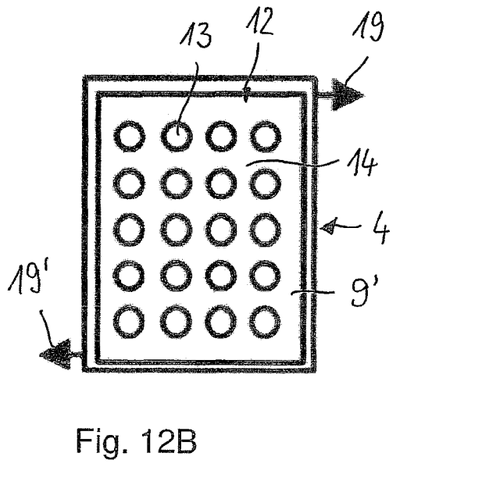
FIG. 12B: a base for a housing assembly according to FIG. 7A in a further embodiment as a detail from below.

FIGS. 12A and 12B schematically show further alternative embodiments for a base 4 for a housing arrangement. This widely corresponds to the embodiment according to FIGS. 10A, 10B, to the description of which it is referred to accordingly. The same and/or corresponding details are provided with the same reference signs as in the above Figures. A special feature of the embodiment according to FIG. 12A is that the cooling structure 12 is formed by parallel connecting regions 13, with intermediate linear channels 14 therebetween. In the embodiment according to FIG. 12B, the connecting regions 13 are formed by points, resulting in a grid-like cooling structure 12.

LIST OF REFERENCE SIGNS 2 housing assembly
3 storage means
4 base
5 frame
6 cover
8 web element
9 first base element
10 second base element
11 third base element
12' cooling structure
13 connecting region
14 hollow region
15 cooling portion
16 support portion
17 support portion
18 web portion
19 connector
20 hollow region
31 first frame element
32 second frame element
33 third frame element
34 fourth frame element
35 edge region
36 edge region
37 edge region
38 edge region
39-39''' corner edges
41, 41' end portion
42, 42' thick portion
43 thick portion
44, 44' thin portion
45, 45' transition portion
46, 46' transition portion
47, 47' transition portion
51, 51' end portion
52 intermediate portion
53, 53' transition portion
55 flange portion
56 flange portion
57 wall portion
58 outer face
61 first cover element
62 second cover element
63 third cover element
64, 64' end portion
65 reinforcing portion
66, 66' transition portion
67, 67' end portion
68 thin portion
69, 69' transition portion
71 reinforcement
72 reinforcement
73 reinforcement
74 reinforcement
75 flange portion
76 flange portion
77 outer face
80 strip material
81 coil
82 rollers
83, 83' sheet metal blank
84 blank group
86 furnace
87 hot forming tool
B width
D thickness
L length
P arrow
V process step

The invention claimed is:

1. A housing assembly for receiving a battery module for an electric drive of an electrically drivable motor vehicle, comprising:
a frame comprising a plurality of frame elements made of a metallic material, with at least one of the frame elements having a variable sheet thickness over a longest length,
a base which is connected to the frame such that a sealed shell is formed, and
a cover detachably connectable to the frame, wherein the base, the frame and the cover enclose a receiving space for the battery module,
wherein the base includes an integrated cooling structure through which a coolant can flow;
wherein the base is made of a plurality of aluminium sheets joined together by roll bonding,
wherein the aluminium sheets are joined together in joining regions by rolling and are spaced apart from each other in hollow regions forming the cooling structure,
wherein the aluminium sheets comprise at least one flat sheet and at least one formed sheet which is connected to the flat sheet and forms the hollow regions, and
wherein the flat sheet has a greater tensile strength and greater yield strength than the formed sheet.

2. The housing assembly according to claim 1,
wherein a first frame element and a second frame element are arranged opposite each other,
wherein a third frame element and a fourth frame element are arranged opposite each other, wherein a length of the third frame element and the fourth frame element is shorter than a length of the first frame element and the second frame element, and
wherein an average thickness of the first frame element and second frame element differs from an average thickness of the third frame element and fourth frame element.

3. The housing assembly according to claim 2,
wherein end portions of the first and second frame elements have a smaller sheet thickness than at least one intermediate portion located between the end portions, and
wherein end portions of the third and fourth frame elements have a smaller sheet thickness than at least one intermediate portion located between the end portions.

4. The housing assembly according to claim 3,
wherein the third frame element and the fourth frame element each have a constant sheet thickness over at least 0.5 times a length thereof.

5. The housing assembly according to claim 1,
wherein the frame is connected to the base such that a liquid-tight and gas-tight shell is formed.

6. The housing assembly according to claim 2,
wherein a reinforcing element is attached from outside to at least one frame element of the first frame element, the second frame element, the third frame element and the fourth frame element, which reinforcing element has a sheet thickness profile analogous to a sheet thickness profile of the respective at least one frame element.

7. The housing assembly according to claim 6,
wherein the at least one frame element has an outwardly bent flange portion for attaching the cover, wherein a width of the flange portion is at least one third of a width of the reinforcing element.

8. The housing assembly according to claim 2,
wherein at least one web element is provided, which extends between the first frame element and second frame element and is fixedly connected to the base, wherein the at least one web element separates two chambers from each other, into each of which the battery module or an additional battery module is insertable,
wherein the first frame element and the second frame element each have at least one connecting portion for connecting the at least one web portion, wherein the connecting portion is thinner than intermediate portions of the first frame element and second frame element adjacent thereto.

9. The housing assembly according to claim 1,
wherein a total cooling area formed by the hollow regions is at least 0.2 times the total area of the base.

10. The housing assembly according to claim 1,
wherein the flat sheet has a greater thickness than the formed sheet, with the thickness of the formed sheet being less than 0.9 times the thickness of the flat sheet.

11. The housing assembly according to claim 1,
wherein the aluminum sheets are spaced apart from each other in second hollow regions which are separate from the first hollow regions and form a reinforcing structure.

12. The housing assembly according to claim 1,
wherein the surface of the base facing the cover is flat, at least in the region for receiving the battery module.

13. The housing assembly according to claim 8,
wherein at least one of the frame elements and at least one of the web elements is made of a high-strength steel or a hardenable steel and is hardened.

14. The housing assembly according to claim 1, wherein the base, the frame and the cover enclose a receiving space for the battery module and at least one additional battery module.

15. A housing assembly for receiving a battery module for an electric drive of an electrically drivable motor vehicle, comprising:
a frame comprising a plurality of frame elements made of a metallic material, and
a base which is connected to the frame in such a way that a sealed shell is formed, and a cover detachably connectable to the frame, wherein the base, the frame and the cover enclose a receiving space for the battery module,
wherein the base has an integrated cooling structure through which a coolant can flow,
wherein the base is made of a plurality of aluminium sheets joined together by roll bonding,
wherein the aluminium sheets are joined together in joining regions by rolling and are spaced apart from each other in hollow regions forming the cooling structure,
wherein the aluminium sheet comprise at least one flat sheet and at least one formed sheet which is connected to the flat sheet and forms the hollow regions, and
wherein the flat sheet has a greater tensile strength and greater yield strength than the formed sheet.

* * * * *